United States Patent [19]

McDonald et al.

[11] 4,362,234
[45] Dec. 7, 1982

[54] HIGH SPEED CAP ORIENTING AND FEEDING APPARATUS

[76] Inventors: Walter McDonald, 558 Dell Rd., Landing, N.J. 07850; Norbert F. Seitel, 45 Gillette Rd., Gillette, N.J. 07933

[21] Appl. No.: 203,128

[22] Filed: Nov. 3, 1980

Related U.S. Application Data

[63] Continuation-in-part of Ser. No. 194,144, Oct. 6, 1980, abandoned.

[51] Int. Cl.$^3$ .............................................. B65G 47/24
[52] U.S. Cl. ...................................... 198/400; 198/380
[58] Field of Search ...................... 198/380, 396, 400; 221/171; 193/46, 48

[56] References Cited

U.S. PATENT DOCUMENTS

| | | | |
|---|---|---|---|
| 3,232,412 | 2/1966 | Bloss | 198/400 |
| 3,526,311 | 9/1970 | Robinson | 198/400 |
| 3,710,924 | 1/1973 | Schultz | 198/400 |
| 4,214,656 | 7/1980 | McDonald et al. | 198/400 |

FOREIGN PATENT DOCUMENTS

| | | | |
|---|---|---|---|
| 2363402 | 7/1975 | Fed. Rep. of Germany | 221/171 |
| 1276361 | 6/1972 | United Kingdom | 198/400 |
| 2035974 | 6/1980 | United Kingdom | 198/400 |

*Primary Examiner*—Joseph E. Valenza
*Attorney, Agent, or Firm*—Weingram & Klauber

[57] ABSTRACT

The apparatus disclosed is used to orient container caps with their open ends facing up from a randomly oriented vertical orientation by guide channel means having a base and including an input end for receiving the caps at the vertical orientation, an output end whereat the caps are reoriented along their diameters with the said open ends facing upwardly, and a transition zone between input and output ends, whereat the caps gravitationally tip and fall to their surfaces which include their diameters; a narrow support member extending longitudinally and centrally along the base of the transition zone for underlying and supporting the caps thereat; and a pair of members extending laterally along the sides of the transition zone, the spacing between the lateral members being such at the upstream end of the zone as to sandwich the caps and constrain same against tipping, and said members diverging toward the downstream end of said zone to remove the constraints and permit gravitational tipping from the narrow support member. According to the improvement, which enables higher speed feed of the caps through the apparatus and increased dependability of tipping in the desired direction, the narrow support member and the lateral members comprise bands which are continually moveable at common speed through the transition zone. The members thereby grasp the caps at the upstream end of the transition zone and convey the caps through the zone, while permitting the caps to gravitationally fall as the lateral bands diverge.

10 Claims, 8 Drawing Figures

FIG. 4
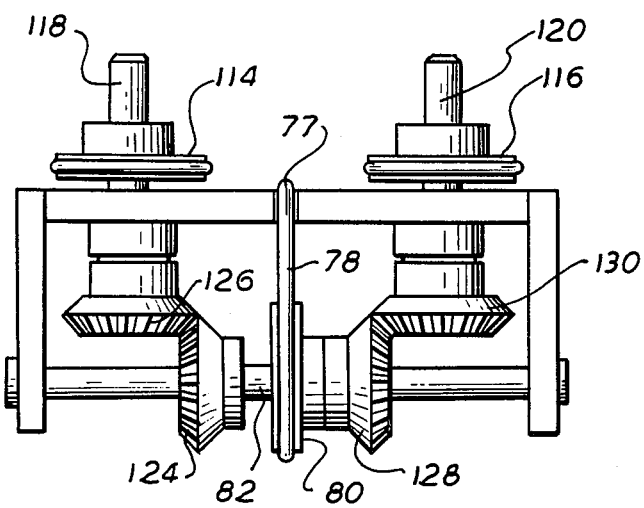
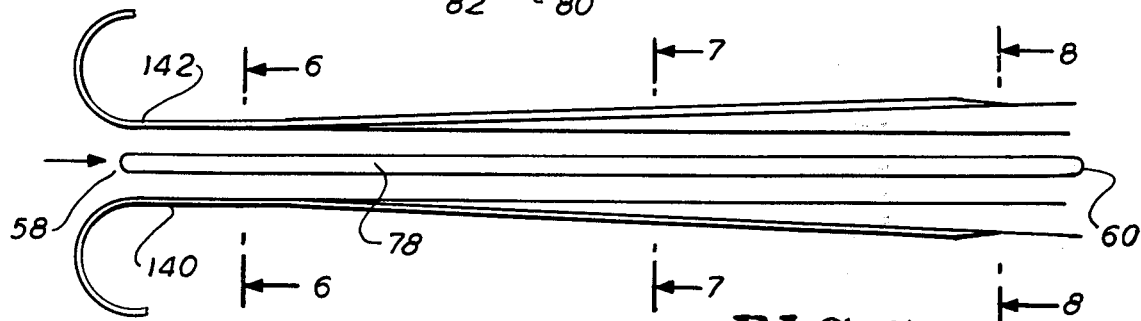
FIG. 5
FIG. 6
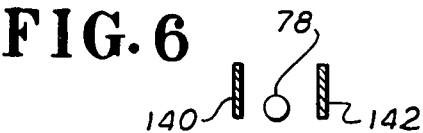
FIG. 8
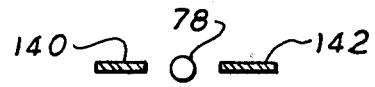
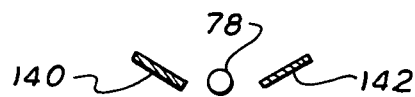
FIG. 7

HIGH SPEED CAP ORIENTING AND FEEDING APPARATUS

This application is a continuation-in-part of Ser. No. 194,144, filed Oct. 6, 1980, abandoned.

BACKGROUND OF INVENTION

This invention relates generally to apparatus for processing container closure caps and similarly configured devices prior to use thereof, and more specifically relates to apparatus for orienting and feeding such devices to thereby provide a stream of the items for further processing, e.g., by cap lining and testing apparatus, or for assembly or the like.

In the course of processing or assembling such objects as container closures, caps, lids or the like, a need often arises to uniformly orient the objects for the processing or assembling operations. An example of such requirement occurs in connection with the apparatus disclosed in U.S. Pat. No. 4,055,455, which patent is in the names of the present inventors herein. Such apparatus is useful in lining and testing container closures such as caps or the like, and includes capabilities for testing the caps and closures for a variety of defects which would impair the usefulness of same. The caps or closures to be thereby processed, must, however, be presented to the apparatus as an incoming stream, wherein each cap is oriented with its open end facing in an upward direction; i.e., this is necessary in order that all appropriate functions of the lining and testing apparatus be performed.

In the past, various apparatus have been known in the art, which act upon a population of randomly oriented such objects, to provide an output of commonly oriented objects—such as an in-line stream of caps oriented with the open ends facing upwardly. However, prior art apparatus enabling such result have generally been of unduly complex design, and of commensurate high cost and reduced dependability.

In the present inventors' U.S. Pat. No. 4,214,656, cap orienting and feeding apparatus are, however, disclosed, which represent a significant improvement upon the prior art apparatus. In the said U.S. patent, a construction is disclosed which enables increased dependability in cap orientation, and also higher speed in feeding of same. These objectives are achieved in an arrangement which includes a feeder bowl for accepting the randomly oriented caps and feeding same from an output port thereof, as an in-line stream of caps oriented in a substantially horizontally plane. An inclined twisting chute extends from the output of the feeder bowl. This chute receives the in-line stream of caps and twists the plane of advance of same through 90°, whereby the caps are reoriented to a stream wherein their diameters are substantially in a vertical plane. A guide chute extends at an incline from the twisting chute and includes an input section for receiving the caps at the vertical orientation, an output section whereat the caps are oriented with their diameters parallel to the support surface, and a transition zone between the input and output sections whereat the caps may gravitationally tip and fall from the vertical plane to the reoriented, more nearly horizontal positions.

A biasing device can be utilized in conjunction with this arrangement for biasing the tipping of the caps so that they fall with the open ends thereof facing in an upward direction. Chute means including a first portion having restraining side walls, maintain the vertical orientation of the objects at this portion, and a second portion extends from the first portion and includes a support knife-edge extending centrally along the base. This second portion has diverging side walls whereby the objects are supported at said second portion in unstable equilibrium solely by the support knife edge, in consequence of which the objects upon being constrained by the side walls tip from the support edge in the direction of the cap tops by virtue of the center of gravity of the objects residing in that direction with respect to the support. Thus, the objects fall with their open ends facing upwardly, and they are thereupon continued in their conveyance through the apparatus, and discharged from same, with the great bulk of the caps being oriented in the proper position, i.e., with their open ends facing upwardly.

In the above connection, it should be emphasized that the "gravitational tipping" of the container caps from the support knife edge is in such direction that the "open" ends of the caps face upwardly, because the heavier, more material-laden portion of the cap is at the top, "closed" end of same, i.e., at the portion of the cap which will normally face away from a container with which the cap is later associated. It should, however, be appreciated that certain container caps which can be processed by the apparatus of U.S. Pat. No. 4,214,656, or by the apparatus of the present invention, are actually technically "open" at both top and bottom thereof. Thus while the cap bottom which will ultimately face the container is "open" from wall to wall, the top side may also include a smaller opening; as for example, when a dispenser nozzle is to be added to such cap prior to final assembly. Also it is possible for transverse partial walls or membranes to be present between the top and bottom of the cap. Accordingly, it is to be understood that when in this specification we refer to the "open" end of the cap, we mean by that term the relatively more open end, i.e., the end which contains less material, and is therefore lighter and less responsive to gravity.

The device of the aforementioned U.S. Pat. No. 4,214,656, while generally quite effective, is less than ideal in at least one important respect. In particular, it will be appreciated that the arrangement of said apparatus contemplates that the caps will advance through the chute, and in particular along the knife edge, by "riding" along same; which usually means that the caps roll along said knife edge, i.e., about their axis. The rolling action is particularly troublesome where high speed feed of the caps is utilized. The reason for this is that gyroscopic forces are generated which can introduce a striking stability to the caps as they advance along the knife edge; and instead of gravitationally tipping, they can indeed advance a considerable distance without any marked tipping. Further, both this rolling action (or even sliding action, i.e., along the knife edge), introduces a certain element of undependability in the tipping action, since erratic contact forces can be generated. The total effect of the aforementioned difficulties is to diminish the dependability of the apparatus, i.e., with respect to proper orientation, and secondly, to limit the feed rate possible through the apparatus.

In accordance with the foregoing, it may be regarded as an object of the present invention, to provide apparatus capable of orienting and ordering a population of randomly arranged caps, containers or closures similarly formed objects, to yield an output stream wherein all such objects are uniformly oriented, thereby facilitating further processing of said objects.

It is a further object of the invention to provide apparatus of the foregoing character, which is capable of feed rates for the said caps which have heretofore been unattainable in prior art apparatus, which device further in accordance with the invention, achieves unusually high dependability as measured by the deviation in numbers of caps from the desired orientation at the output of the said apparatus.

SUMMARY OF INVENTION

Now in accordance with the present invention, the foregoing objects, and others as will become apparent in the course of the ensuing specification, are achieved in an improvement which is applicable to apparatus of the type disclosed in the aforementioned U.S. Pat. No. 4,214,656. Such prior art apparatus is adapted to accept an initially presented population of randomly oriented container caps and provide an output in-line stream of the caps wherein the open ends of the caps all face in an upward direction. Such apparatus includes means for accepting the randomly oriented caps and feeding an in-line stream of the caps wherein same are oriented with their diameters substantially in a vertical plane; and guide channel means having a base and including an input end for receiving the caps at their said vertical orientation, an output end whereat the caps reside along their diameters with the open ends thereof facing upwardly, and a transition zone between the input and the output ends whereat the caps may gravitationally tip and fall from their said vertical orientation to reside on their surfaces which include their diameters; a narrow support member extending longitudinally and centrally along the base of the transition zone for underlying and supporting the caps; and a pair of members extending laterally along the sides of the transition zone, the spacing between such members being such at the upstream end of the zone as to sandwich the caps to constrain same against tipping, and the members diverging toward the downstream end of the zone whereby to remove the constraints and permit gravitational tipping from the narrow support member.

According to the improvement of the invention, the narrow support member and the lateral members comprise bands which are continually movable at common speed through the transition zone. The members thereby grasp the caps at the upstream end of the transition zone and convey the caps through the zone, while permitting the caps to gravitationally tip and fall as the lateral bands diverge, which events occur without the caps being rolled along the support member or being otherwise rotated about their axes. In consequence of this arrangement, any tendency toward generation of gyroscopic forces is completely eliminated, which enables much higher feed rates of the caps through the channel and apparatus, and greatly increased dependability of tipping in the desired direction, i.e., with the open ends of the caps facing upwardly.

The narrow support member preferably comprises a continuous band of circular cross-section, which permits the periphery of the band residing above the guide channel base to serve as a support edge for the caps, which effectively ride thereupon.

Each of the aforementioned lateral members may also comprise a band of circular cross-section, which can be of the same or of a different diameter from that of the support member. Each of the three bands may be driven through a common drive means, in order to assure that they move through the transition zone at a common speed.

In a further embodiment of the invention, the lateral members may comprise flattened bands, the planes of which which are substantially vertical at the input end of the transition zone, whereby to facilitate sandwiching and constraining support of the caps in their vertical orientation, with the plane of the bands being twisted downstream of the input end so that the bands are substantially horizontal at the output end of the said zone.

The apparatus of the invention may further include a rotatable metering wheel just upstream of the transition zone, and in contact with the caps of the in-line stream being provided to the transition zone input end. Means are provided for rotating the said metering wheel at a speed appropriate to feed the caps to the transition zone at a rate corresponding to the feed rate through the transition zone—and thus ultimately through the apparatus.

Beyond the transition zone, i.e., beyond the output from same, a converging section may be provided to restore a complete in-line formation of the caps—which by virtue of the tipping action have been somewhat displaced from the center line of the guide channel at the diverged portion of the transition zone. In order to assure rapid feed through at this diverging output section of the apparatus, a tube may be provided through which high pressure air is fed to discharge in the direction of feed of the caps, such air stream serving to facilitate discharge of the caps from the apparatus.

BRIEF DESCRIPTION OF DRAWINGS

The invention is diagramatically illustrated, by way of example, in the drawings appended hereto, in which:

FIG. 4 is an end view of the output end of the subject apparatus, and illustrates a portion of the drive train;

FIG. 5 is a schematic plan view of the transition zone of the apparatus, in an alternate embodiment of same; and FIGS. 6, 7 and 8 are cross-sectional views, again schematic in nature, taken respectively along the lines 6—6, 7—7 and 8—8 of FIG. 5.

DESCRIPTION OF PREFERRED EMBODIMENT

Figure 1:
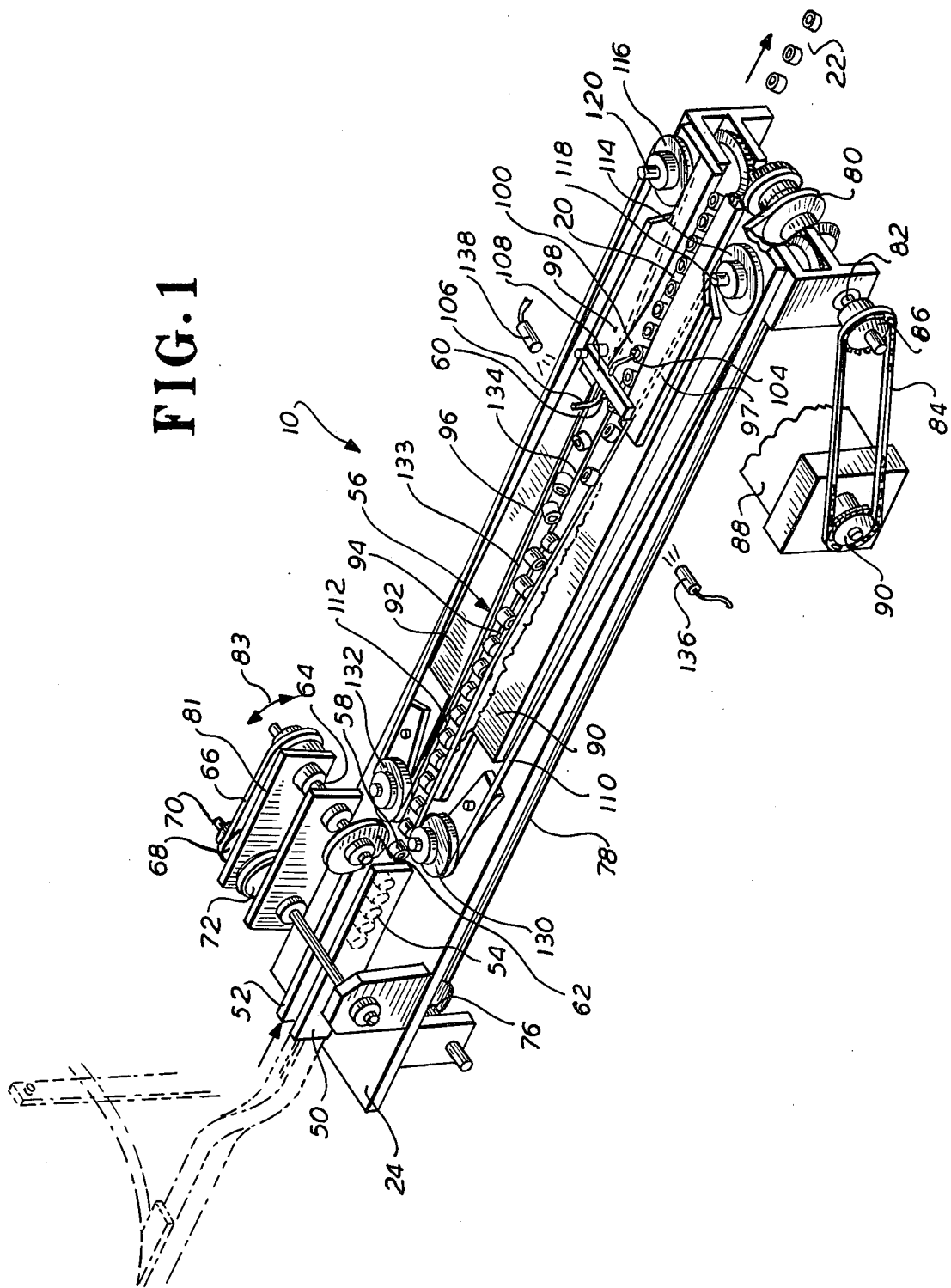
FIG. 1 is a perspective view illustrating principal portions of the subject apparatus, with the exception of the feeder bowl.
Figure 2:
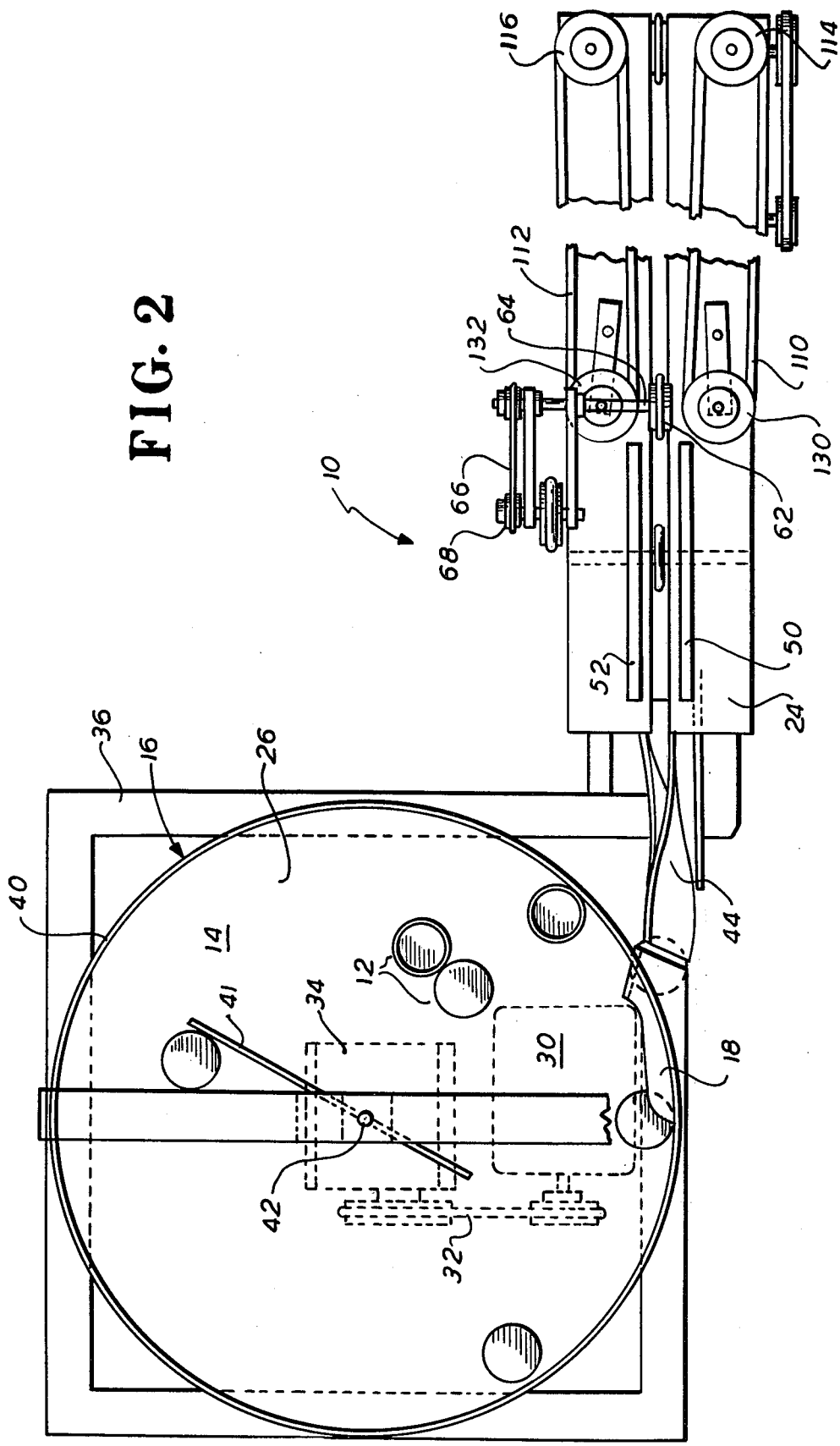
FIG. 2 is a top plan view of the apparatus of FIG. 1; the right-hand portion of the Figure is broken to foreshorten the depiction, thereby enabling the apparatus to otherwise appear in its entirety.
Figure 3:
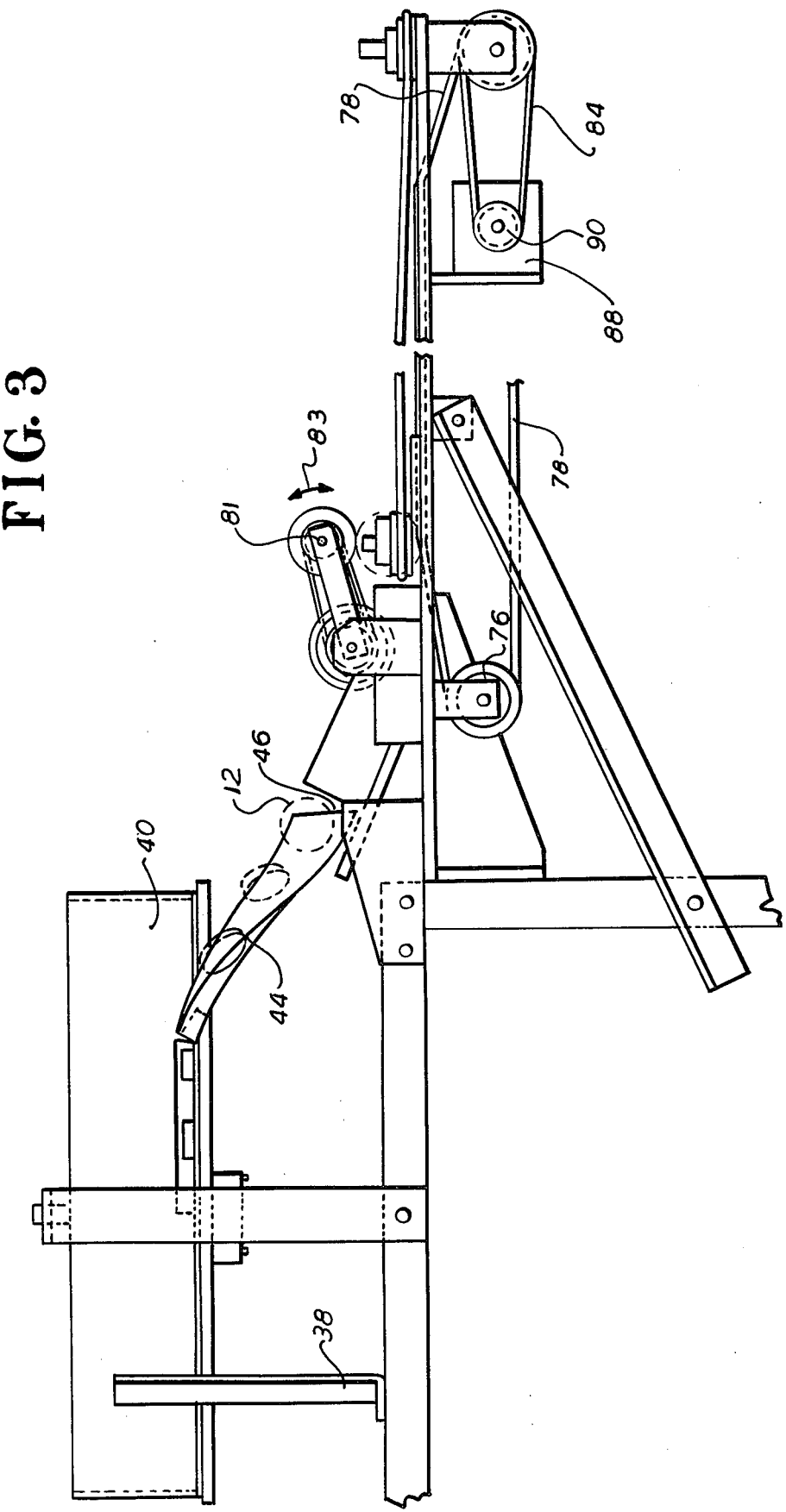
FIG. 3 is a side elevational view of the apparatus of FIG. 1; this again is broken to foreshorten the depiction; thereby enabling the apparatus to be illustrated in its entirety.

In FIGS. 1 through 3 herein, perspective, top plan, and side elevational views appear of apparatus 10 in accordance with the present invention.

Referring to the general nature of the present apparatus 10, it is seen that in the first instance a population of randomly assorted closures or container caps, some of which are seen at 12, are loaded into the receiving chamber 14 of a feed bowl generally designated at 16. The caps are fed from output port 18 of feed bowl 16, and after being reoriented and ordered by the remaining portions of the apparatus to be described, eventually are provided as an in-line stream 20 of caps which is ejected at 22. The stream 20 of caps are now all oriented with the caps open ends facing in an upward direction—which is the desired orientation where such caps are, e.g., to be provided for further processing, as for example, to lining and testing apparatus of the type disclosed in U.S. Pat. No. 4,055,455, or for other purposes.

In some instances, the stream 20 of uniformly oriented caps can be reoriented to another direction, as may be appropriate to an assembly operation or so forth. The important point is that the uniformity and continuity of stream 20 makes this a very simple operation. The caps 12 may be of the general type also discussed in aforementioned U.S. Pat. No. 4,055,455. Typically these are plastic or metal caps, intended for use in closing of containers, e.g., of the type associated with consumer products or the like. Thus the caps ultimately—upon reaching the further apparatus—may be provided with liners, and can be tested for various defects or so forth.

Those portions of apparatus 10 residing in the left of base plates 24 are not, per se, of the present invention, but indeed correspond in function and substantially in design to corresponding elements discussed in our aforementioned U.S. Pat. No. 4,214,656.

Thus, feeder bowl 16 includes an underlying rotatable table or platform 26 which rotates via a shaft which is driven by motor 30, transmission belt 32 and a reducer 34. All of these elements are ultimately secured to a frame 36. A plurality of uprights 38 support the peripheral wall 40 which together with platform 26, serves to define chamber 14.

In order to achieve in simple fashion an effective and continuing feed of closures 12 from output port 18, a flexible metal distributing blade or vane 41 extends from a stationary support piece 42. The blade 41 is of thin metal and therefore can flex in or counter to the direction of rotation of platform 26. As platform 26 rotates carrying the random cap population, the caps tend to impinge against blade 41, which flexes and deflects the caps to and toward the periphery, i.e., the output portions of platform 26. This in turn assures a continuing supply of caps 12 at the outer regions of the platform, and prevents agglomeration of such caps toward the center regions of platform 26.

By virtue of the continuing rotation of platform 26 and of the mentioned action of distributing blade 41, combined with the centrifugal forces acting on the caps, a supply of caps 12 is developed at the outer regions of platform 26, which introduces a continuing feed source proceeding to and then through port 18. While caps 12 will commonly become horizontally oriented as they move about in chamber 14, port 18 may further be defined as a rectangular opening in wall 40 with the short dimension of the rectangle vertically oriented. This arrangement assures that only horizontally oriented caps will pass through the said port.

Port 18 is directly coupled to a twisting chute 44, which chute is adapted to receive the caps 12 in the substantially horizontal plane in which they exit the feed bowl, and thereupon turn or twist the caps through 90° so that at the output 46 of chute 44, the caps have become reoriented to reside in a vertical plane, as e.g., can be seen from the cap 12a existing from chute 44. No specific drive means or the like are present in chute 44; the movement of the said caps therethrough is primarily under the influence of gravity, i.e., chute 44 is seen to decline at an angle from output port 18 of feed bowl 16; and further the pressure of the stream feeding from bowl 16 provides an additional positive force moving the stream of caps in and through twisting chute 44. At this point in the continuing progression of the caps, chute 44 is seen to join base plate 24, at which is mounted a pair of guide pieces 50 and 52. These guide pieces are separated by a distance corresponding to approximately the height of the cap or container closure, whereby the line of vertically oriented container closures pass between the said guide pieces in in-line fashion as can be seen at 54. To be borne in mind is that the said caps at this point continue to have a continuing component of forward movement by virtue of the feed pressure resulting from the feed bowl 16 and the passage of the caps down chute 44.

As caps 12 pass beyond the guide pieces 50, 52, they enter a transition zone generally designated at 56. Transition zone 56 represents the portion of the present apparatus 10 whereat the caps are reoriented from their vertical positions as same enter the input end 58 of zone 56, so that by the time they leave the output end 60 of such zone, they have been oriented so that they reside on their upper surface, i.e., the surface including their diameter, and with the open ends thereof facing in an upward direction.

The feed rate of caps 12 to transition zone 56 is regulated by a rotatable metering wheel 62. Such metering device functions to provide a desired uniformity for the rate of cap flow.

The metering wheel 62 is mounted in such manner as will enable same to peripherally contact and ride upon the edges of caps 12 as same proceed beyond guide pieces 50, 52 to input end 58 of transition zone 56. Wheel 62 is driven by a shaft 64, in turn driven through belt 66, which is driven by member 68. The later rotates on a shaft 70 on which is mounted a further driven member 72, the drive belt 74 for which passes beneath base plate 24 where it is driven by a further rotatable member mounted upon the lower shaft 76. Shaft 76 in turn is driven by a band 78 of circular cross-section. Band 78, as will shortly be discussed, also constitutes the underlying support member for the caps 12 as they pass through transition zone 56. Band 78, as may be seen from FIGS. 1 and 3, constitutes a continuous closed loop—part of the loop is broken away in FIG. 3 for purposes of clarity. That band 78, in turn is seen (toward the output end of apparatus 10) to pass about a member 80, which is on a shaft 82 driven through belt 84 and member 86 by a drive means 88 via the member 90. Means 88 is connected to a suitable electric motor drive.

The shaft 64 is further seen to be journaled for rotation in a frame 81. Frame 81 has a degree of rotational freedom in the directions 83, i.e., about the axis 70, which action permits metering wheel 62 to ride in contact with the advancing caps, i.e., by bobbing in the directions 83 as the caps pass under the wheel in contact therewith. This action also permits a given wheel 62 to accomodate caps of different diameters. Wheel 62 is preferably provided with a surface making good frictional engagement with the cap peripheries, as for example, of natural or artificial rubber or the like.

Since the said indexing wheel is commonly driven with the aforementioned band 78, it will be apparent that by proper adjustment of the respective rates of rotation of the surface of wheel 62 and of band 78, and by proper selection of wheel size, and drive and coupling wheels, etc., the feed rate of the caps to the input end 58 of transition zone 56, can be rendered in accordance with the rate of feed of the caps 12 through such transition zone—and ultimately through apparatus 10.

As has been previously suggested, a principal aspect of the present invention resides in the vast increase in dependability of operation and of cap feed rate which is enabled by the structures at transition zone 56. Referring to that zone, it is seen that same is partially defined by two plates 90 and 92, which are in turn mounted upon base plate 24. Between such plates, a guide channel 94 exists through which the advancing caps 12 proceed. The edges 96 of plates 90, 92 are so formed that channel 94 begins as a parallel-walled channel toward the input 58 of transition zone 56, but thereupon diverges toward the output end 60. Beyond output end 60, two further guide pieces 97 and 98 abound an exit channel 100 through which the caps 12 proceed as they leave output end 60 of the transition zone. The walls 104 which abound channel 100 are seen to converge (in the direction of cap flow) at the ends of same which adjoin output 60, whereby the caps (which are then horizontally oriented and somewhat spread laterally) are converged to provide the desired in-line stream 20 which then exits from the apparatus at 22. This exiting is facilitated by means of a pressurized air stream which is provided through a tube 106, in turn supported at a block 108, which overlies the exiting stream of caps and also serves to assure that no caps can pass to exit channel 100 which are not in a horizontal orientation.

It is next seen that transition zone 56 is bounded laterally by bands 110 and 112, each of which are formed as continuous loops, and each of which may comprise in the present embodiment a cylindrical or tubular-formed elastomeric plastic, as for example, a polyurethane or the like, of relatively narrow diameter (typically of the order of ¼ inches). Each of bands 110 and 112 are driven by pulleys 114, 116 mounted upon shafts 118 and 120. These shafts, seen in FIGS. 1 and 4, are in turn run off the common drive shaft 82, respectively through gears 124 and 126, and 128 and 130. Thus, each of the shafts 118 and 120 are driven at a common speed, as are the bands 110 and 112.

As already indicated, and as may be seen in several of the Figures, including FIG. 1 and FIG. 3, a further band 78, which in the present embodiment is of the same material and diameter as are bands 110 and 112, is driven at the same speed as the latter bands by the pulley 80, which is mounted on the same drive shaft 82 which powers shafts 118 and 120. Thus, the speed of advance of band 78 is the same as that of bands 110 and 112.

Referring to FIGS. 1, 3 and 4, it will be clear that approximately between the input end 58 and output end 60 of transition zone 56, the uppermost edge 77 of band 78 resides above the floor of channel 94; and thus it will be clear that the caps 12 beyond input end 58 actually rest upon and are balanced upon the periphery of the band 78—which is of circular cross-section. It will also be evident from FIGS. 1 and 2, that the positions of shafts 118 and 120 toward the downstream end of the apparatus are such in relationship to the idlers 130 and 132 at input end 58 of the transition zone, that the portions of bands 110 and 112 which abound channel 94 diverge toward the downstream end of the transition zone, i.e., becoming markedly diverged at approximately region 133.

With the aid of the foregoing the operation of the present device may now be fully comprehended. In particular it is seen that each of the caps as it passes beyond metering wheel 62 is grasped or sandwiched between the bands 110, 112 at the point where the cap is received, i.e., between idlers 134 and 136. At the same time the peripheral wall of the cap comes to rest upon the underlying band 78, which is somewhat above the floor of channel 94, as mentioned. The three bands 78, 110 and 112 thereupon move with common speed; and thus each of the caps now begins to advance while being sandwiched laterally between bands 110, 112 and simultaneously resting upon band 78. Thus the cap is advanced or conveyed by the moving bands without any rolling or rotational action, i.e., the cap is simply translated (without rotation) in the direction of the apparatus output. Thereupon, at approximately the region 133, the lateral bands 110 and 112 begin to diverge sufficiently to remove the lateral constraints which have prevented the caps from gravitationally tipping from the narrow support edge, which edge is defined by the underlying band 78. In this respect, the tipping and falling operation, is as has been previously discussed in our U.S. Pat. No. 4,214,656, except of course the mode of cap conveyance is completely distinct, with no rotation being generated at the said caps.

In consequence of the present arrangement, coupled with the advantages accruing from resting on the circular cross-section of the underlying band 78, the said caps thereupon gravitationally tip and fall, but with a suprising dependability—by virtue of complete absence of gyroscopic forces. The said caps in particular, gravitationally fall in the direction of the generated torque, which as is seen at region 134, results in the caps decending into that widened part of channel 94, with their open ends facing upwardly. Thereupon a pair of compressed air sources, 136 and 138, may assist in displacing the fallen caps toward the center line of channel 94, and as they enter the exit channel 100, as previously discussed, they are reconverged into the desired inline stream 20.

In FIG. 5 and the cross-sectional views of FIGS. 6 through 8, an alternate embodiment of the apparatus 10 is set forth. Only a schematic representation of the bands of the transition zone 56 appears, in order to render clear the distinction in operation. In this instance, the device is substantially identical to that previously described, except that the lateral bands (110 and 112 in prior Figures) instead of being of tubular or cylindrical cross-section (which is the form in which band 78 remains), are now formed as flattened bands 140 and 142. Similar drive means are utilized as discussed in connection with prior Figures, except that it is seen that the flattened bands (see the cross-sectional views of FIGS. 6, 7 and 8) are disposed so that their planes are substantially vertical at the input 58 of the transition zone, while at the output end 60 thereof, they have been twisted through an angle of 90° so that they are substantially in a horizontal plane. This of course, requires use of a differing pulley arrangement at the output end of the apparatus, i.e., instead of the upright shafts 118 and 120, upon which pulleys are mounted, the said bands 134 and 136 pass directly to two further drive pulleys which can be mounted upon and driven by shaft 82.

The advantage of the embodiment of FIGS. 5 through 8, is that the said bands, toward the input end 58 of the transition zone 56, serve to better grasp and carry the caps; while at or toward the output end 60 they do not interfere in any way with the tipping and falling action, i.e., at the diverging portion of the transition zone.

While the present invention has been particularly described in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. In apparatus for accepting an initially presented population of randomly oriented container caps and providing an output in-line stream of said caps wherein the open or lighter ends of the caps face in an upward direction; said apparatus including means for accepting said randomly oriented caps and feeding an in-line stream of said caps wherein the caps are oriented with their diameters substantially in a vertical plane; and guide channel means having a base and including an input end for receiving said caps at said vertical orientation, an output end whereat the caps reside along their diameters with the open ends thereof facing upwardly, and a transition zone between the input and output ends whereat said caps may gravitationally tip and fall from the said vertical plane to their surfaces which include said diameters; a narrow support member extending longitudinally and centrally along the base of said transition zone for underlying and supporting said caps thereat; and a pair of members extending along the lateral sides of said transition zone, the spacing between said members being such at the upstream end of said zone as to sandwich the said caps to constrain same against tipping, and said members diverging toward the downstream end of said zone, whereby to remove said constraint and permit said tipping; the improvement enabling higher speed feed of said caps through said channel and increased dependability of tipping in the desired direction, comprising:

said narrow support member and said lateral members comprising bands which are continually moveable at common speed through said transition zone; said members thereby grasping said caps at the upstream end of the said transition zone and conveying said caps through said zone, while permitting same to gravitationally fall as said lateral bands diverge, without said caps being rolled along said support member or otherwise being rotated about their axes.

2. Apparatus in accordance with claim 1, wherein said support member comprises a continuous band of circular cross-section, the periphery of said band residing above said guide channel base, whereby to support said caps thereupon.

3. Apparatus in accordance with claim 1, wherein each of said lateral members comprise a band of circular cross-section.

4. Apparatus in accordance with claim 3, wherein each of said bands comprises an elastomeric material.

5. Apparatus in accordance with claim 3, wherein each of said bands are driven through a common drive means.

6. Apparatus in accordance with claim 2, wherein each of said lateral members comprise flattened bands, the planes of which are substantially vertical at the input end to said zone and are twisted to be substantially horizontal at the output end from said zone.

7. Apparatus in accordance with claim 6, wherein said flattened bands comprise an elastomeric material.

8. Apparatus in accordance with claim 2, further including a rotatable metering wheel upstream of said transition zone and in contact with the caps of the in-line stream being provided to the transition zone input; and means for rotating the said metering wheel at a speed appropriate to feed said caps to said transition zone at a rate corresponding to the feed rate through said zone or provided by said bands.

9. Apparatus in accordance with claim 2, wherein said apparatus further includes an output channel adjoining the output end of said transition zone of said feed channel, said output section having a base and a converging portion at the end thereof adjoining said transition zone output end, for receiving the caps proceeding from said transition zone and realigning same; and said section including means for facilitating movement of said caps therethrough.

10. Apparatus in accordance with claim 9, wherein said means facilitating movement of said caps through said output channel comprises means for directing an air stream under pressure at said caps, in the direction of advance thereof.

* * * * *